J. GOETZ, W. K. BUXBAUM & F. A. PARSONS.
LUBRICATING SYSTEM FOR MILLING MACHINES.
APPLICATION FILED APR. 18, 1913.
1,120,807.
Patented Dec. 15, 1914.
2 SHEETS—SHEET 1.
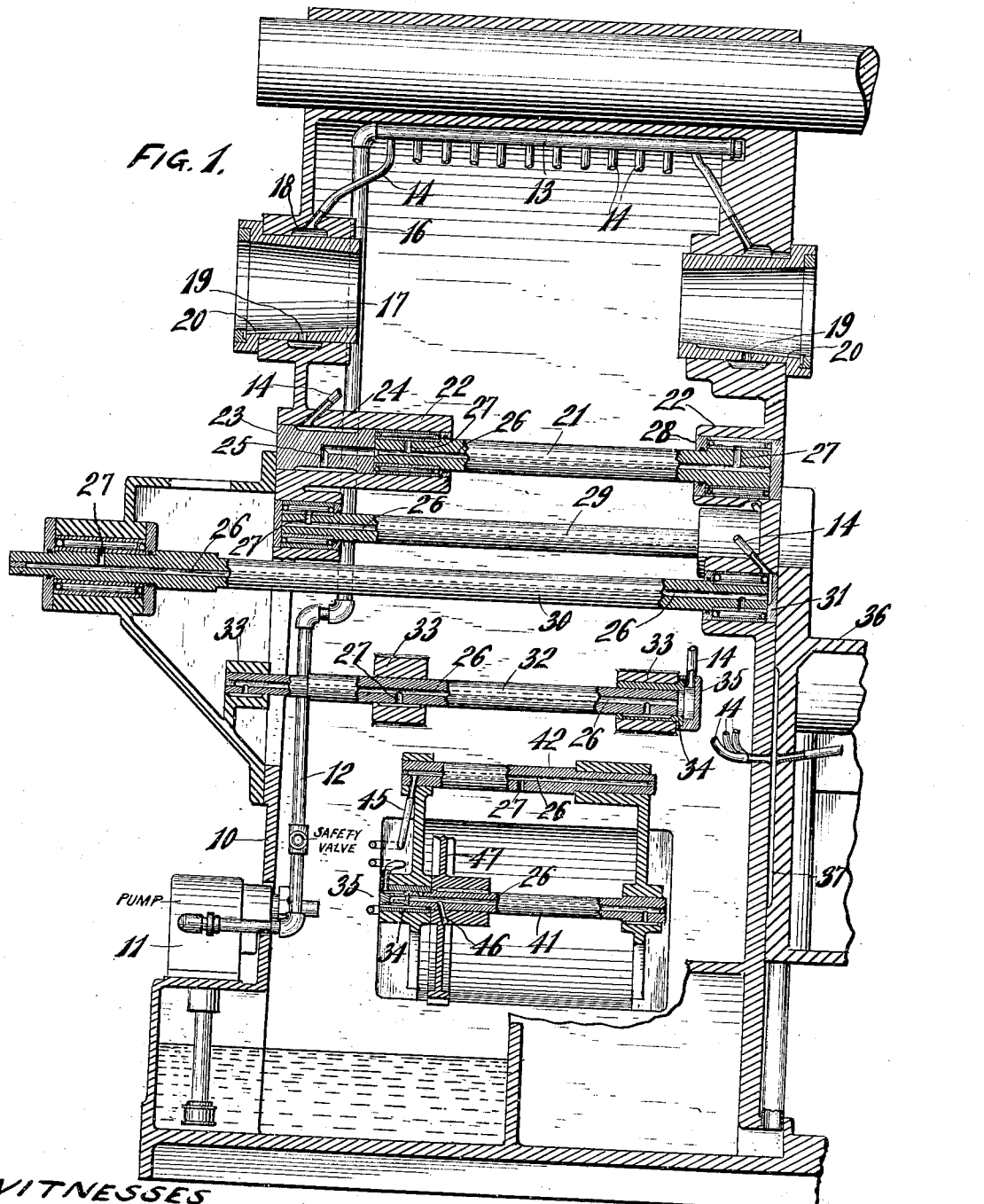

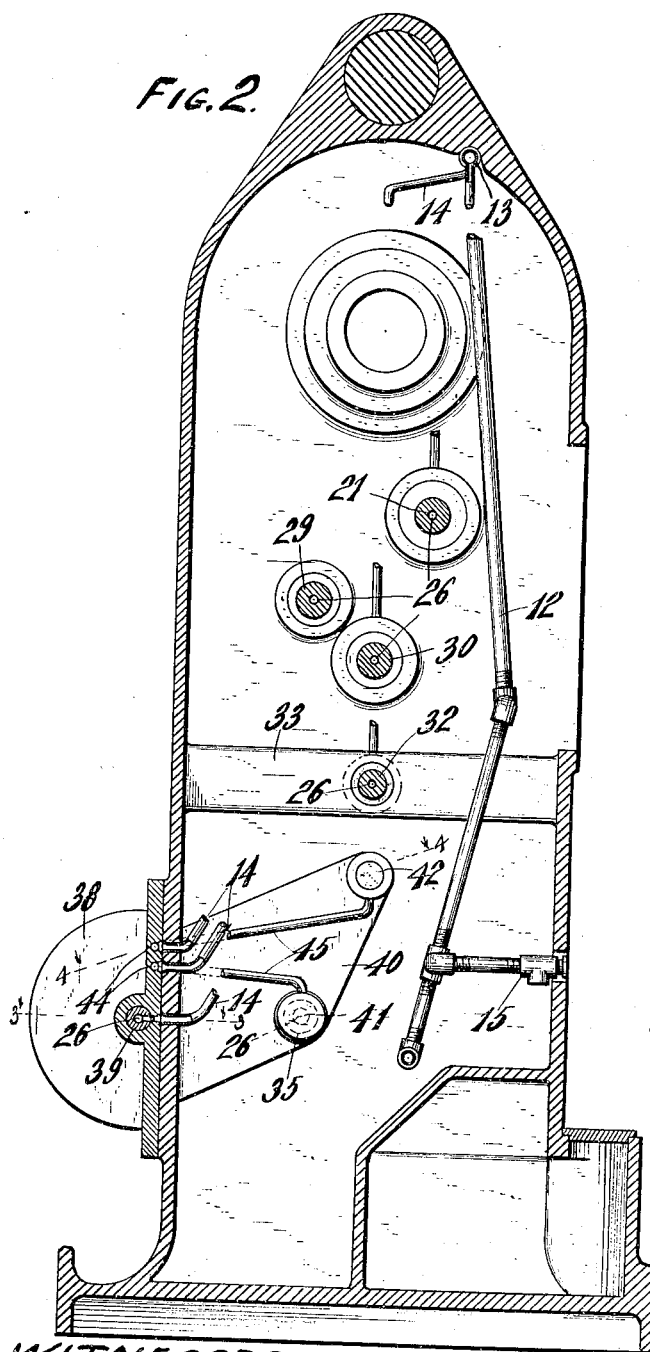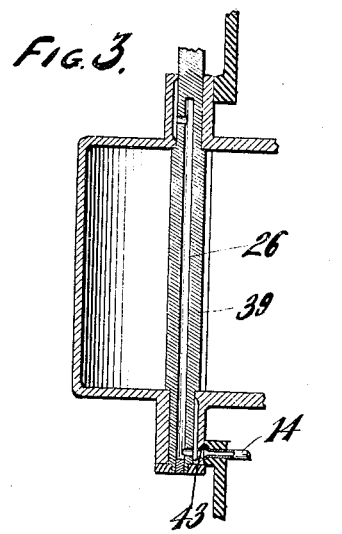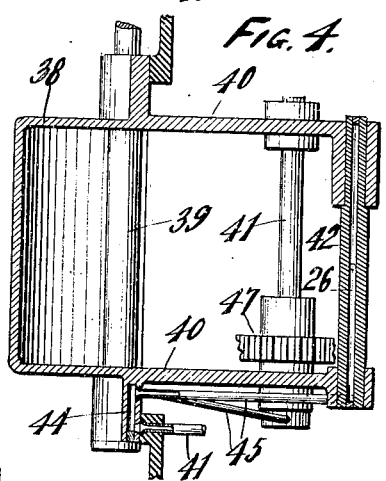

UNITED STATES PATENT OFFICE.

JOHN GOETZ, OF WEST ALLIS, AND WILLIAM K. BUXBAUM AND FRED A. PARSONS, OF MILWAUKEE, WISCONSIN, ASSIGNORS TO THE KEMPSMITH MANUFACTURING CO., OF MILWAUKEE, WISCONSIN, A CORPORATION OF WISCONSIN.

LUBRICATING SYSTEM FOR MILLING-MACHINES.

1,120,807.     Specification of Letters Patent.     Patented Dec. 15, 1914.

Application filed April 18, 1913. Serial No. 761,870.

*To all whom it may concern:*

Be it known that we, JOHN GOETZ, a citizen of the United States, and a resident of West Allis, and WILLIAM K. BUXBAUM and FRED A. PARSONS, citizens of the United States, and residents of Milwaukee, in the county of Milwaukee and State of Wisconsin, have invented new and useful Improvements in Lubricating Systems for Milling-Machines, of which the following is a description, reference being had to the accompanying drawings, which are a part of this specification.

This invention relates to a system for automatically supplying lubricant to the various shafts and bearings within a milling machine frame or casing and has for its object to conduct the lubricant from one bearing to another by means of an opening through the shaft.

Another object of the invention is to so conduct the lubricant that centrifugal force of the rotating parts will not interfere with the lubricant supply, but will materially assist the same.

With the above and other objects in view the invention consists in the lubricating system for milling machines as herein claimed and all equivalents.

Referring to accompanying drawings in which like characters of reference indicate the same parts in different views: Figure 1 is a central vertical sectional view of a milling machine frame or casing with various shafts thereof stripped of gearing and other connections, but equipped with the lubricating system of this invention; Fig. 2 is a transverse vertical sectional view thereof; Fig. 3 is a sectional plan view of a portion of the removable gear box on the plane of line 3—3 of Fig. 2; and, Fig. 4 is a similar view thereof on the plane of line 4—4 of Fig. 2.

In these drawings 10 indicates the frame or casing of a milling machine within which various shafts are journaled in bearings and 11 indicates a suitably operated oil pump for lifting oil from the bottom of the casing through an oil supply pipe 12 to a horizontal distribution pipe 13 at the top of the casing from which numerous lead pipes 14 extend to the various bearings for the shafts. The intermediate portion of most of the lead pipes 14 has been omitted for clearness of illustration, but it will be understood that these pipes are so arranged as to avoid interference with the mechanical parts. A relief valve 15 is contained in the lubricant supply pipe 12 to return surplus oil to the bottom of the casing when the pressure from the pump exceeds the pressure desired for the lubricating system.

Arbor bearings 16 containing taper bored bushings 17 have internal annular recesses 18 which are supplied with lubricant by lead pipes 14 and communicate with the interior of the bushings through openings 19 in the bottom of the latter from which a groove 20 extends lengthwise of the bushing in the inner bearing surface thereof, thus assuring an effective supply of lubricant to the bearing surfaces of the arbor, such supply being admitted from beneath where it is less liable to become interfered with by particles of foreign matter which may be contained in the lubricant.

A shaft 21 is journaled in bearing boxes 22 of the frame, one of which is made of sufficient length to contain a plug member 23 in addition to the ball and roller bearings of the shaft. This plug has an annular groove 24 surrounding it which is supplied with lubricant by one of the lead pipes 14 and an annular passageway 25 through the plug conducts the lubricant from said annular groove 24 to the center of the end of the shaft 21 where it flows through a central opening or bore 26 through the shaft and from this central opening it enters bearings at both ends of the shaft through radial openings 27. The roller bearings of the shaft are provided with packing rings 28 to retain the lubricant and prevent a too free return flow thereof to the bottom of the casing where it eventually finds its way. Other shafts 29 and 30 are similarly provided with lubricant, though because of the shorter bearing boxes a thin plug 31 with merely a groove connecting the lead pipe 14 with the central opening of the shaft may be employed in place of the plug 23.

A shaft 32 is journaled in three bracket bearings 33, the first of which is provided with a shouldered bushing 34 having a cap 35 fitting thereon and forming communication between the lead pipe 14 and the central opening 26 of the shaft, each of the three bearings being supplied with lubricant from the central opening of the shaft through the radial openings 27.

Lubricant communication with the various moving parts of the adjustable knee 36 of the machine is maintained through vertical grooves 37 of the knee registering with the ends of lead pipes 14, but the details of such knee lubricating system constitute the subject matter of a separate application.

The frame or casing 10 has an opening therein over which is secured a removable gear box 38 having a shaft 39 journaled therethrough and said gear box has a pair of plates 40 extending well within the casing with a shaft 41 journaled between them and a fixed shaft 42 secured between their ends. A lead pipe 14 extends to the edge of the opening of the casing and the flange of the gear box 38 has an opening 43 registering with said lead pipe and communicating with both bearings of the shaft 39, communication with the distant bearing being made through a central opening 26 of the shaft as with the other shafts mentioned. Other lead pipes 14 also connect with the edge of the opening of the casing and register with openings 44 in the flange of the gear box, there being tubes or pipes 45 leading from said openings 44 and connecting with a support for shaft 42 and a bearing for shaft 41 respectively. The pipe connection with the shaft 42 preferably extends to the central bore of said shaft as shown in Fig. 1 and supplies lubricant through a radial opening 27 at an intermediate point on the shaft to lubricate a part turning on the shaft while the other pipe 45 connects with a cap 35 on a bushing bearing 34 of the shaft 41 in the same manner as is done by the lead pipe 14 of the shaft 32. Lubricant for shaft 41 is supplied to the distant bearing through the central opening 26 in the manner described in connection with the other shafts, and further there is a radial opening 46 leading from such central opening through the hub of a gear wheel 47 to permit lubricant to be fed to the teeth of the gear wheel, traveling from the hub to the teeth by centrifugal action.

By means of the lubricating system of this invention the various bearings are kept well lubricated and the piping system is simplified by utilizing the shaft itself as a conduit for conveying the lubricant from one end thereof to the other so that two or more bearings are supplied by the same lead pipe. Furthermore the lubricant by entering the shaft from its end instead of through a radial opening is not impeded by centrifugal action tending to force it backwardly.

What we claim as new and desire to secure by Letters Patent is:

1. A lubricating system, comprising a casing, bearing boxes in the casing, a tubular shaft journaled in the bearing boxes, a forced feed lubricant supply means having connection with one of the bearing boxes, a plug fitting within said bearing box and having a passageway leading from the lubricant supply means to the center of the end of the plug next to the shaft whereby lubricant is delivered to the bore of the shaft, and bearings in the bearing boxes in which the shaft turns, there being openings in the shaft leading from its bore to said bearings for conveying lubricant thereto.

2. A lubricating system, comprising a casing having an opening, a removable gear casing for covering said opening, a tubular shaft journaled in the gear casing, and forced feed lubricant supply means connecting with the edge of the opening of the casing, there being a passageway in the gear casing registering with the lubricant supply means and communicating with the bearings of the shaft.

In testimony whereof, we affix our signatures, in presence of two witnesses.

JOHN GOETZ.
WILLIAM K. BUXBAUM.
FRED A. PARSONS.

Witnesses:
R. S. C. CALDWELL,
C. H. KEENEY.